April 30, 1940.    G. F. DRAKE    2,198,603
AUTOMATIC CONTROL FOR CONDITIONING SYSTEMS
Filed Aug. 19, 1937    2 Sheets-Sheet 1

INVENTOR
George Forrest Drake
BY
Parker, Carlson, Pitzner & Hubbard
ATTORNEYS

April 30, 1940.   G. F. DRAKE   2,198,603

AUTOMATIC CONTROL FOR CONDITIONING SYSTEMS
Filed Aug. 19, 1937   2 Sheets-Sheet 2

INVENTOR
George Forrest Drake
BY
Parker, Carlson, Pitzner & Hubbard
ATTORNEYS

Patented Apr. 30, 1940

2,198,603

UNITED STATES PATENT OFFICE 2,198,603

AUTOMATIC CONTROL FOR CONDITIONING SYSTEMS

George Forrest Drake, Rockford, Ill., assignor, by direct and mesne assignments, to Barber-Colman Company, Rockford, Ill., a corporation of Illinois Application August 19, 1937, Serial No. 159,873

15 Claims. (Cl. 236—74)

This invention relates generally to automatic controls for modulating the movements of a regulating device to correspondingly change the effective capacity of a conditioning apparatus and thereby maintain uniform the temperature or humidity or other condition in a space to be conditioned. More particularly, the invention is directed to a control of the so-called proportioning type in which the regulating device assumes a different equilibrium position for each different value of the condition being controlled.

With some types of air conditioning apparatus, particularly those in which the conditioning capacity changes rapidly in response to movement of the regulating device and the response of the controlling instrument is relatively slow, closer regulation of the controlled condition may be obtained with a proportioning control than with a so-called floating type of control. The equipment heretofore used in practice to obtain a proportioning action has involved the use of balanced relays, slide wire or leak port control instruments, pneumatic operators, or other mechanism which are costly to manufacture and maintain in adjustment and which are affected adversely by variations in friction.

The general object of the present invention is to provide a new and improved electric proportioning control in which the movements of the regulating device will follow the changes in the condition being controlled with much greater accuracy than with proportioning controls of the types heretofore used, and this, without frequent adjustment or attention in service use.

A more detailed object is to provide a new and improved proportioning control in which a controlling instrument of the simple double switch type is employed, in which the actuator for the regulating device operates under full power at all times, in which the control point of the sensitive instrument changes immediately and closely follows the changes in the position of the regulating device, and which operates on alternating current.

The invention also resides in the novel construction of the mechanism by which the control point of the sensitive instrument is varied in order to obtain the desired proportioning action.

Other objects and advantages of the invention will become apparent from the following detailed description taken in connection with the accompanying drawings, in which Figure 1 is a schematic view and wiring diagram of a heating system controlled in accordance with the present invention.

Figure 1:
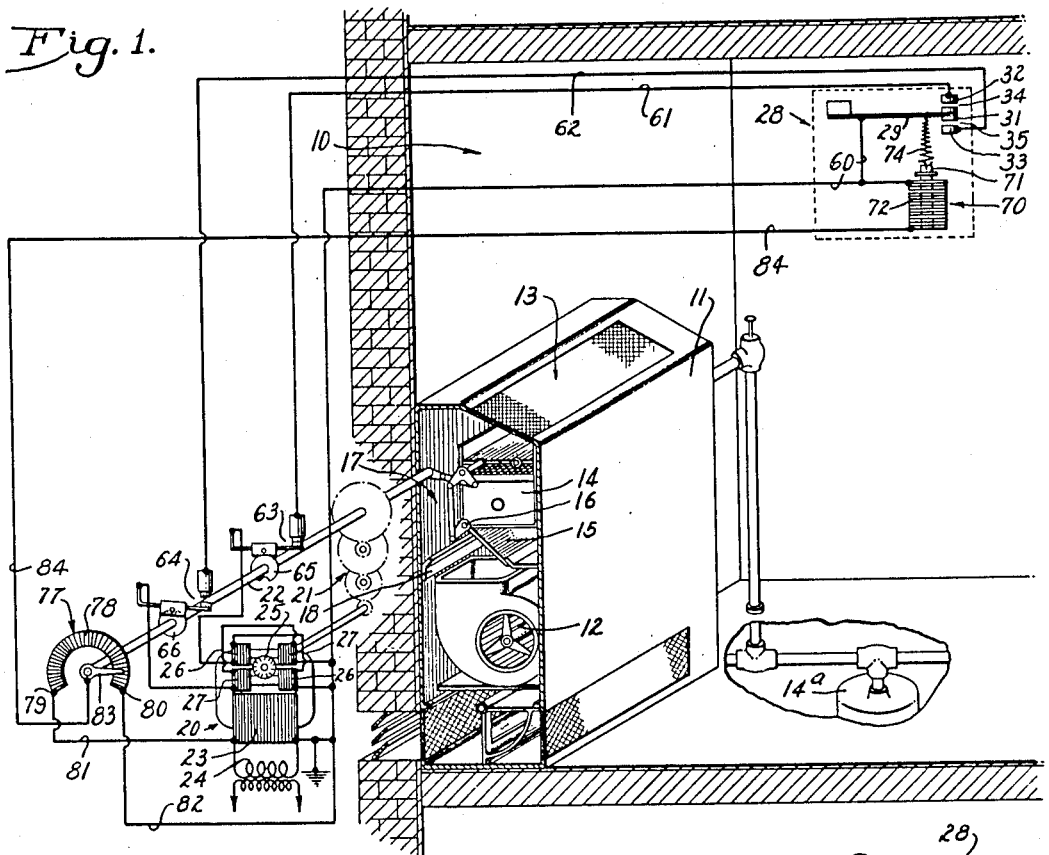

While the invention is applicable to the control of different conditions through the medium of various kinds of regulating devices such as valves, dampers, program motors, speed changers, rheostats, etc., the invention has, for convenience of illustration, been shown in the drawings and will be described as applied to the control of typical forms of heating and humidifying systems. I do not intend to limit the invention by such exemplary disclosure but aim to cover all modifications and alternative constructions and uses falling within the spirit and scope of the invention as expressed in the appended claims.

The heating system shown in Fig. 1 is of the so-called unit ventilator type wherein the conditioning medium is fresh air or recirculated air or a mixture of both drawn through inlets in a casing 11 by a power driven blower 12 and discharged through the casing outlet 13 into the room or space 10 to be conditioned after part or all of the air stream has passed over a steam radiator 14 or other heater supplied with heating fluid by a boiler 14ª. The proportion of the air current subjected to the heating coil is determined by the position of a regulating device in the form of a damper 15 pivoted at 16 and swingable from the full-cooling position shown in which all of the air is diverted around the coil 14 through a by-passage 17 to a full-heating position against a stop 18 in which all of the air is directed through the coil. The conditioning capacity and therefore the temperature of the delivered air thus varies progressively with changes in the position of the damper.

Herein, the damper is arranged to be oscillated varying distances back and forth by an electric motor 20 operating through speed-reduction gearing 21 to drive a main operating shaft 22 connected by suitable cranks and links to the damper. Preferably, the motor is of the shaded pole induction type having a winding 23 constantly energized from a low voltage source 24 of alternating current and a rotor 25 arranged to turn clockwise and counterclockwise respectively according to which of two sets of shading coils 26 and 27 is short-circuited, the rotor remaining idle when both coils are open-circuited.

The sensitive control instrument for detecting deviations in the controlled condition, that is, the room temperature in the present instance, comprises a thermostat 28 of the simple double switch type. The thermostat has a bimetallic element 29 adjustably supported at one end on an insulating base 30 and carrying at the other end a contact 31 movable between two limit positions against stationary adjustable contacts 32 and 33 and cooperating therewith to form switches 34 and 35. To provide for optimum sensitivity of the thermostat, the bimetallic strip 29 is relatively wide and thin and is disposed substantially horizontally near the upper portion of a housing formed by the base 30 and a cover 36 fitting thereon. The latter has apertures 37 in its side and top walls permitting of free circulation of air over the element 29. With the element thus constructed and arranged, the entire surface area is exposed effectively.

The end of the element 29 remote from the contacts is riveted or otherwise secured to an arm 38 (Figs. 3 and 4) which is clamped between insulating plates 39 carried by a member 40 pivoted on a stud 41 projecting from the base 30. A contractile spring 42 acting on the arm 38 urges the assembly counter-clockwise about the pivot 41. Rigid with the member 40 is a depending arm 43 which bears against a lug 44 on a lever 45 pivoted on a stud 46 which also pivotally supports an elongated lever 47. The two levers are connected by an eccentric screw 48 by which their angular relation may be varied for initial adjustment of the instrument.

By moving the lower projecting end 49 of the lever 47 laterally, the point of support of the element 29 may be varied thereby changing the effective control point of the thermostat, that is, the temperature of the thermostatic element at which the contact 31 will be disposed midway between the contacts 32 and 33. Such setting is maintained by friction exerted by a washer 50 which is urged against the lever by a spring 51 surrounding a screw 52 which projects through a slot 53 in the lever. The position of the adjusting lever and therefore the setting of the thermostat is indicated on a scale visible through an opening 55 in the casing 36. This scale is on a disk 56 rotatably supported by the thermostat base and carrying a pinion 57 driven through idler gears 58 from a gear segment on an arm 59 rigid with the lever 47.

The contact 31 is connected by a conductor 60 to the common terminal of the shading coils 26 and 27, and conductors 61 and 62 extend from the contacts 32 and 33 through limit switches 63 and 64 to the insulated terminals of the coils 26 and 27. The limit switches 63 and 64 are opened by cams 65 and 66 on the shaft 22 in the full-heating and full-cooling positions of the damper 15. Preferably, the contacts 32 and 33 are spaced as close together as is practicable while at the same time maintaining clearance between the cooperating switch contacts in the neutral position of the element in which both switches are open.

When the temperature of the thermostatic element falls below the prevailing control point for which the thermostat is set to respond, the contact 31 moves to heat-increasing position against the contact 32 and closure of the switch 34 short-circuits the shading coils 26 whereupon movement of the damper 15 toward full-heating position is initiated. This increase in the heating capacity of the unit ventilator continues until the switch 34 opens after which the position of the damper will remain fixed so long as the thermostat tongue remains in the neutral position shown with both switches open. Movement of the tongue 29 to heat-decreasing position against the contact 33 as a result of a rise in temperature above the prevailing control point closes the switch 35. This short-circuits the coils 27 and causes the motor to operate in a direction to increase the proportion of the air by-passed around the heating coil and thereby decrease the effective capacity of the heater.

Adaptation of the control above described for operation with a true proportioning action as contemplated by the present invention is effected through the provision of a novel electrically controlled means which operates automatically to vary the effective control point of the room thermostat 28 through a narrow temperature range progressively and substantially instantaneously with changes in the position of the regulating member or damper 15. In the present instance, this means comprises a magnet 70 disposed within the thermostat casing and having an armature 71 connected to the thermostatic element 29 so as to exert on the latter a light mechanical force of a magnitude determined by the degree of energization of the magnet.

Preferably, the magnet and the connections between the latter and the thermostatic element are constructed and arranged so that the mechanical force exerted on the element 29 varies in a substantially linear relation with changes in the position of the damper and is substantially unaffected by fluctuations in the alternating current by which the magnet is energized. To these ends, the magnet 70 is of the solenoid type comprising a coil 72 wound on a spool 73 and receiving the plunger or armature 71 which is suspended vertically from a point near the free end of the thermostatic element 29 through the medium of a light contractile spring 74. Thermal insulation of the solenoid from the thermostatic element is effected by an insulating partition 75 molded on the base 30 and abutting the cover 36. A stem 76 on the armature projects loosely through a hole in the partition.

A linear relation between the current energizing the solenoid and the pull exerted by the latter is obtained by arranging the solenoid for operation on the straight portion of its pull curve wherein the pull for a given degree of energization is substantially unaffected by a change in the position of the armature. For this purpose, the parts are so constructed and arranged that the movement of the lower end 71ᵃ of the armature is confined to the central portion of the spool bore, moving from one limit (Fig. 3) to the other limit position shown in Fig. 6.

The spring 74 is constructed to possess substantially greater resiliency than the thermostat tongue 29 so as to constitute a motion reducing connection. Thus, the spring will expand and contract as the pull of the solenoid increases and decreases thereby correspondingly increasing and decreasing the force exerted on the thermostatic element. Owing, however, to the greater resiliency of the spring, the movement of the element resulting from a change in the position of the armature will be only a small fraction, approximately 1/60 in the present instance, of the armature movement. Energization of the solenoid over a comparatively wide range is thus required in order to effect a relatively small change in the control point of the thermostat. This not only avoids the necessity of extreme precision in the construction of the thermostat but permits of a narrow temperature range through which the proportioning action is effected without sacrificing accuracy of the control point within such range.

The spring 74 is preferably of conical form so that each turn thereof possesses a different natural period of vibration. Due to this construction and the substantial resiliency of the spring, vibrations of the armature 71 due to the periodic fluctuations of the energizing current are damped out effectually and transmission thereof to the armature is avoided. By adding a weight 71$^b$ of non-magnetic metal to the lower end of the armature, the amplitude of vibration of the armature is reduced.

The solenoid winding 72 is maintained energized continuously during operation of the heating system, the degree of energization being governed by a voltage regulator having a control element movable in unison with the regulating device. To produce an approximate linear relation between the energization of the solenoid and the position of the regulating device, it is preferred to employ a rheostat 77 of the potential dividing type. This comprises a stationary resistance element 78 of arcuate shape having opposite terminal ends 79 and 80 connected by conductors 81 and 82 to the alternating current source 24. The resistance element is engaged intermediate the ends by a contact arm 83 fast on the operating shaft 22.

One terminal of the solenoid winding 72 is connected to the arm 83 by a conductor 84 and the other terminal is joined by conductors 60 and 82 to the terminal 80. The voltage impressed on the winding is therefore determined by the drop across that portion of the resistance element 78 between the terminal 80 and the arm 83. Because the magnitude of the solenoid current is in the present instance small as compared to the current flow through the resistance element 78, the voltage drop between the arm 83 and the terminal 80 varies as a true linear function of the arm movement. In view of this relation and that established as above described between the solenoid energizing current and the force exerted on the tongue 29, it follows that the solenoid pull will vary substantially in a linear relation with changes in the position of the damper 15.

As the arm 83 wipes across the resistance element 78 during heat-increasing movement of the damper and counter-clockwise rotation of the shaft 22 produced by short-circuiting of the shading coils 26 in response to closure of the thermostat switch 34, the voltage drop between the arm and the terminal 80 increases progressively. The resulting increase in the force exerted by the solenoid imposes more and more tension on the thermostatic element 29 resulting in a corresponding lowering of the thermostat control point. Similarly, the energizing current decreases progressively as the shaft turns clockwise as it will while the thermostat switch 35 is closed and the shading coils 27 short-circuited.

Figure 3:
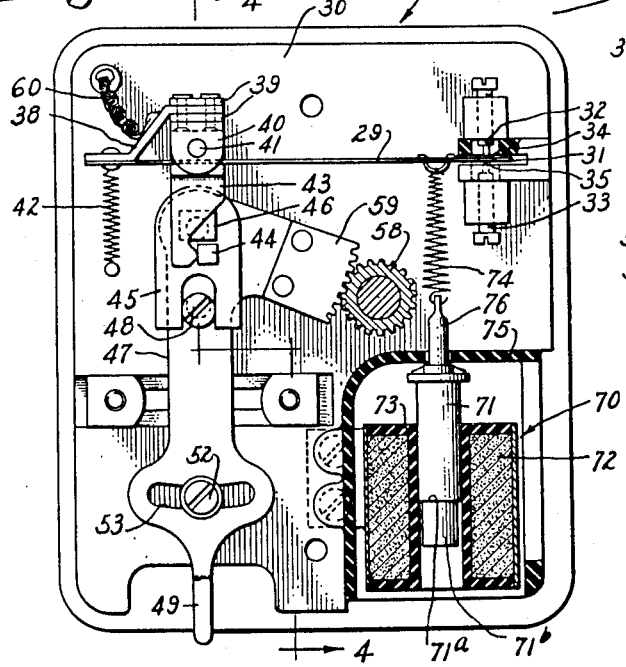
Fig. 3 is an elevational view of the controlling instrument with the cover thereof removed and certain of the parts shown in section.
Figure 2:
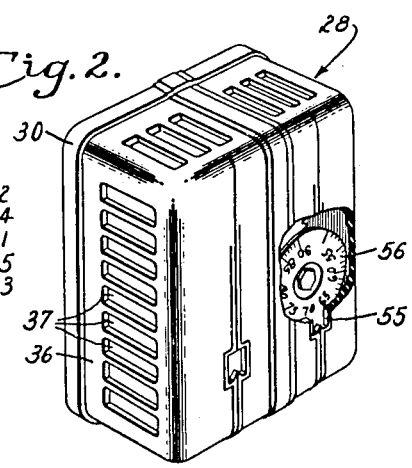
Fig. 2 is a perspective view of the controlling instrument.
Figure 4:
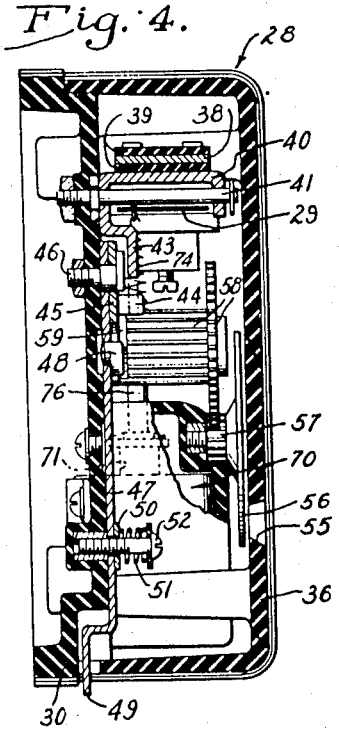
Fig. 4 is a sectional view taken on the line 4—4 of Fig. 3.
Figure 5:
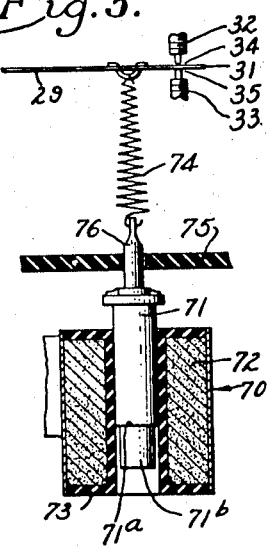
Figs. 5 and 6 are fragmentary detailed views of parts of the control instrument illustrating different operating positions.
Figure 6:
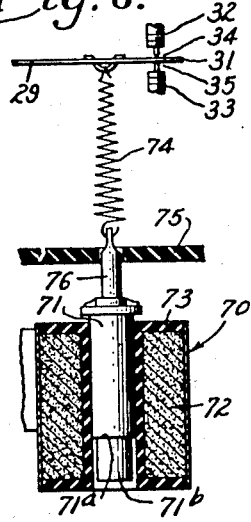

The armature 71 will be disposed as shown in Figs. 3, 5, and 6 in response to the voltage impressed on the winding 72 when the damper is in full-cooling position, half-way open, and in full-heating position respectively.

The value of the resistance 78 is coordinated with the construction of the solenoid 70 and the thermostatic element 29 so that the temperature range through which the control point of the thermostat will be shifted in the movement of the rheostat from one limit position of the damper to the other will be as small as practicable without the attendant danger of objectionable hunting of the damper in the establishment of its equilibrium position under different operating conditions. Ordinarily, with apparatus of the character illustrated, a control point shift of a few degrees, for example, three degrees, may be employed.

In considering the operation of the system above described, let it be assumed that the range of shift of the thermostatic control point is three degrees Fahrenheit, that the thermostat has been set for 70 degrees by manipulation of the adjusting lever 47, and that the parts are positioned as shown in Fig. 1, the damper 15 being in full-cooling position. Under these conditions, the room temperature surrounding the thermostatic element 29 would then be at the upper limit of the range through which the control point shifts, that is, 71.5 degrees.

When the room temperature falls sufficiently below 71.5 degrees to permit closure of the thermostat switch 34, for example to 71 degrees, the coils 26 will be short-circuited, and the motor will run in a direction to turn the shaft 22 counter-clockwise and thereby open the passage through the heating coil 14. Heat is supplied to the room at a rate which increases with the opening of the damper. In this movement of the damper, the rheostat arm 83 will move away from the terminal 80 causing the voltage impressed on the solenoid 70 to be increased accordingly thereby progressively decreasing the control point of the thermostat as above described. Opening of the damper and lowering of the thermostat control point will continue until the pull of the solenoid has been increased sufficiently to open the switch 34 at the prevailing 71 degrees. The damper will thus assume a partially open (16%) equilibrium position corresponding to the new room temperature. This position is held so long as the newly established rate of heat delivery to the room maintains the room temperature between the values at which the switches 34 and 35 are closed at the 71 degree control point of the thermostat determined by the 70 degree position of the adjusting lever 47 coupled with the newly established degree of energization of the solenoid.

Now, if the new rate of heat delivery is insufficient to maintain the room temperature for which the thermostat is conditioned, the temperature will fall, for example to 70 degrees, causing the switch 34 to again close thereby initiating further movement of the damper toward full-heating position. In this movement, the control point of the thermostat is reduced still further until, when equilibrium is again established, the damper will be half-way open and the tongue 29 will be disposed between the contacts at an ambient temperature of 70 degrees.

Any time that the room temperature rises above the point at which the switch 35 is closed under the existing condition of the thermostat, operation of the motor 20 in the reverse direction under the action of the shading coils 27 will be initiated. The damper will be moved in a direction to decrease the rate of heat delivery. Simultaneously, the voltage impressed on the solenoid will be decreased during the clockwise movement of the arm 83. The control point of the thermostat will thus increase progressively until equilibrium is again established as evidenced by positioning of the thermostat tongue between the contacts 32 and 33 under the higher prevailing temperature.

From the foregoing, it will be seen that the solenoid and its energizing mechanism always operate in response to a change in the position of the damper to change the control point of the thermostat in the direction of the room temperature change causing such damper movement. The thermostat control point is thus shifted with the room temperature and the amount of the shift corresponds to the room temperature change. As a result of this true proportioning action, the damper assumes an infinite number of equilibrium positions corresponding to different room temperatures. Under the conditions assumed, the damper will be disposed in full-cooling and full-heating positions at room temperatures of 71.5 and 68.5 degrees respectively. At 70 degrees, the damper will be half open.

Through the use of the solenoid 70 and the provision for changing the thermostat control point in a linear relation with respect to the damper movements, the control point is changed instantaneously with a movement of the damper and is proportioned accurately in accordance with this movement. In addition, the damper positioning mechanism is extremely sensitive to changes in temperature. This is due in part to the fact that the control instrument used is of the simple double switch type in which friction on the sensitive element and the necessity of using relays or the like are eliminated. Secondly, the full power of the electric operator by which the regulating device is actuated is available at all times and does not decrease as the system approaches the equilibrium condition. Finally, the thermostatic element is constructed and located to obtain a high degree of sensitivity and the solenoid is adapted to operate reliably on alternating current.

As a result of the novel and advantageous characteristics above outlined, the present control operates with much greater precision than prior proportioning controls in positioning the regulating device to correspond to condition changes. Substantially closer regulation of the condition to be controlled is thus made possible.

The present control operates in a similar manner when used for controlling cooling apparatus. For such an application, however, the circuit connections of the thermostat switches would be reversed, the control point of the thermostat increasing as the regulating device moves to increase the effective capacity of the cooling apparatus.

Figure 8:
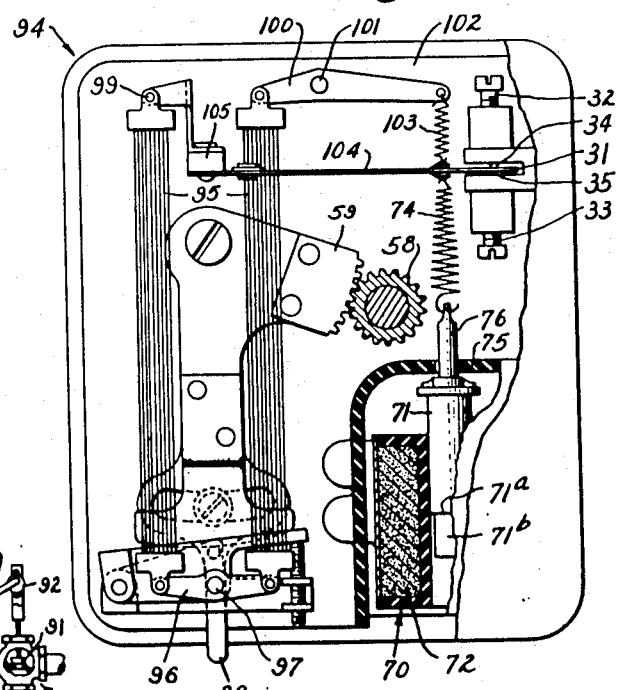
Fig. 8 is an elevational view of an humidostat partially broken away to show the operating parts.
Figure 7:
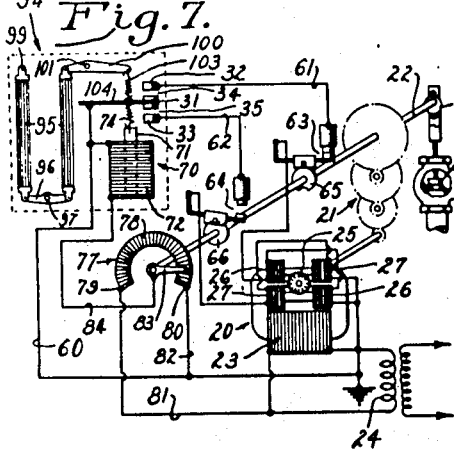
Fig. 7 is a schematic view and wiring diagram illustrating the adaptation of the present control to an humidity control system.

Figs. 7 and 8 illustrate the present invention as applied to the control of humidity regulating apparatus. In this instance, the regulating device may take the form of a valve 90 arranged to modulate, according to its degree of opening, the amount of moisture delivered to a space to be conditioned. The movable member 91 of the valve may be actuated by a cam 92 on the main operating shaft 22. All of the other parts of the actuating and control apparatus with the exception of the humidostat proper are the same as those previously described and are numbered correspondingly. The humidostat which is disposed in the space being conditioned is indicated generally at 94. It includes a sensitive element composed of hair arranged in two multiple strips 95 respectively connected to opposite ends of an equalizing bar 96. The latter is fulcrumed on a pivot 97 which may be shifted by swinging a hand lever 98 to change the setting of the instrument. The other end of one strip is anchored at 99 and the second strip is joined to the free end of a lever 100 pivoted at 101 on the humidostat base 102.

Humidity responsive elements of the above character are not resiliently extensible. In order, therefore, to provide for movement of the contact 31 back and forth in response to changes in the force applied by the spring 74 due to variations in the solenoid 70, a light contractile spring 103 is stretched between the lever 100 and a strip 104 and is disposed in axial alinement with the spring 74. At one end, the strip 104 carries the contact 31 and the other end of the strip is supported at 105 on the base 102.

With the parts thus arranged, the elements 95 will be held taut by the spring 103 which will exert a force on the contact strip 104 which opposes the force of the spring 74 and varies progressively with changes in the relative humidity of the ambient air. In response to a fall in humidity below the control point for which the instrument may at any time be conditioned to respond, the elements 95 will contract resulting in an increase in the tension of the spring 103 and movement of the strip 104 in a direction to close the switch 34. Closure of the latter initiates opening movement of the valve 90 so as to increase the capacity of the humidifying apparatus. In this movement of the valve, the energization of the solenoid 70 is increased progressively in the manner previously described until the resultant increase in the force applied by the spring 74 overcomes the spring 103 and moves the contact 31 to neutral position. The reverse action takes place in response to closure of the switch 35 by a decrease of the tension on the spring 103 resulting from elongation of the humidity responsive elements with a rise in relative humidity. Thus the control operates with a proportioning action to move the humidity regulating device to different equilibrium positions corresponding to different values of relative humidity of the air being conditioned.

This application is a continuation in part of my copending application Serial No. 26,349, filed June 13, 1935.

No claim is made herein to the condition responsive instruments apart from the disclosed control systems which instruments, per se form the subject matter of my copending applications Serial No. 185,388, filed January 17, 1938 and Serial No. 301,897, filed October 30, 1939.

I claim as my invention:

1. A control for air conditioning apparatus having, in combination, a member for regulating the capacity of said apparatus, a sensitive instrument having coacting control elements relatively movable in opposite directions in response to opposite changes in the air condition to be controlled, means controlled by said instrument for modulating the position of said member, a solenoid having a coil and an armature surrounded by and having one end projecting partially through said coil, a coiled contractile spring stretched between said armature and one of said elements, and mechanism for maintaining said coil energized and varying the energization thereof progressively with changes in the position of said member.

2. A control for air conditioning apparatus having, in combination, a member for regulating the capacity of said apparatus, a sensitive instrument having coacting control elements relatively movable in opposite directions in response to opposite changes in the air condition to be controlled, means controlled by said instrument for modulating the position of said member, a solenoid having an elongated coil and an armature surrounded by and having one end projecting partially through said coil, the other end of said armature being connected to one of said elements, and mechanism for maintaining said coil energized and varying the energization thereof progressively with changes in the position of said member, said solenoid being arranged to operate on the straight portion of its pull curve substantially throughout the range of energization thereof by said mechanism.

3. A control for air conditioning apparatus having, in combination, a member for regulating the capacity of said apparatus, a sensitive control instrument having a control element resiliently movable in opposite directions in response to opposite changes in the air condition to be controlled, means controlled by said instrument for modulating the position of said member, a solenoid having a coil and an armature surrounded by and having one end projecting partially through said coil, a motion reducing connection between said armature and said element, and mechanism for maintaining said coil energized and varying the energization thereof progressively with changes in the position of said member.

4. A control for conditioning apparatus having, in combination, a regulating device controlling the conditioning capacity of said apparatus, means including a sensitive control instrument arranged to modulate the position of said device and having an element movable in opposite directions in response to condition variations relative to the control point for which the instrument is set to respond, an electromagnetic means having a movable armature and a winding, a coiled contractile spring stretched between said armature and said element and comprising a plurality of turns of different diameters, an alternating current source energizing said winding, and means for varying the energization of said electromagnetic means automatically with changes in the position of said device.

5. In combination with air conditioning apparatus, an instrument having an element movable in opposite directions in response to air condition variations relative to the control point for which the instrument is set to respond, a regulating device modulated by said instrument and variably controlling the conditioning capacity of said apparatus, electromagnetic means having a movable armature operatively associated with said element and a winding for energizing said armature, a rheostat of the potential dividing type controlling the energization of said winding, and means for actuating said rheostat progressively with changes in the position of said device.

6. In combination with air conditioning apparatus, an instrument having an element movable in opposite directions in response to air condition variations relative to the control point for which the instrument is set to respond, a regulating device modulated by said instrument and variably controlling the conditioning capacity of said apparatus, electromagnetic means having a movable armature operatively associated with said element and a winding, a rheostat having an elongated resistance member and a contact member engageable therewith, a source of current connected to opposite ends of said resistance member, conductors connecting the terminals of said winding to said contact member and one terminal of said resistance member, and means for relatively moving said members to vary the voltage impressed on said winding progressively with changes in the position of said device.

7. A control for temperature changing apparatus having, in combination, a regulating member movable in opposite directions to vary progressively the capacity of said apparatus, a thermostat comprising a resilient strip of bimetallic material for moving a contact element between condition-increasing and condition-decreasing positions against stops cooperating with the element to define control switches, a power operator controlled by said thermostat and operating to move said member in a direction to increase and decrease the capacity of said apparatus when said contact element is in said increasing and decreasing positions respectively, the position of said member remaining fixed when both of said switches are open, an alternating current electromagnetic means having a movable armature mechanically connected to said element and exerting thereon a force which changes immediately in response to a change in the energization of the electromagnetic means, and means associated with said operator and acting to vary the energization of said electromagnetic means automatically with the movement of said member and in the direction corresponding to the condition change causing such movement.

8. A temperature control system having, in combination, a regulating device, a thermostat governing the modulating movements of said device and having a thin strip of bimetallic material disposed in a substantially horizontal plane in the space to be controlled, a solenoid having a movable armature suspended vertically from said strip and a winding surrounding said armature, and means for maintaining said winding normally energized and for varying the energization thereof progressively with the movements of said device.

9. A temperature control system having, in combination, a regulating device, a thermostat governing the modulating movements of said device and having a thin strip of bimetallic material disposed in a substantially horizontal plane in the space to be controlled, an electromagnet having an armature connected to said strip and urging the latter in one direction, and means for maintaining said electromagnet energized and for varying the energization thereof progressively with the movements of said device.

10. For controlling an air conditioning apparatus, the combination of a regulating device movable in opposite directions to modulate the conditioning capacity of said apparatus, a control member movable between opposite positions and operable when in the respective positions to cause movement of said device in corresponding directions, an electromagnetic means having a movable armature, a contractile spring stretched between said armature and said member, a sensitive non-yieldable element responsive to changes in the condition of the air to be controlled, a contractile spring stretched between said member and said element and acting in opposition to said first mentioned spring, and means for varying the energization of said electromagnetic means with the movements of said device.

11. A condition control system having, in combination, a regulating device movable in opposite directions to modulate a condition to be controlled, a member movable between opposite positions and operable when in the respective positions to cause movement of said device in corresponding directions, two springs acting on said member in opposition to each other, electromagnetic means arranged to stress one of said springs according to the degree of energization of the electromagnetic means, a non-yieldable element for variably stressing the other spring with variations in a condition to which the element is exposed, and means for varying the energization of said electromagnetic means with changes in the position of said device.

12. For controlling humidifying apparatus, the combination of a regulating device movable in opposite directions to modulate the humidifying capacity of said apparatus, a member movable between opposite positions and operable when in the respective positions to cause movement of said device in corresponding directions, two springs acting on said member in opposition to each other, a solenoid having a movable armature connected to one of said springs to stress the same according to the degree of energization of the solenoid, an element adapted to expand and contract in response to opposite changes in the humidity of the air to which the element is exposed and operatively associated with the other spring, and means for varying the energization of said solenoid with changes in the position of said device.

13. A control for conditioning apparatus having, in combination, a member for regulating the capacity of said apparatus, a sensitive control instrument having a control element movable in opposite directions in response to opposite changes in the condition to be controlled, a power driven operator controlled by said instrument for modulating the position of said member, an electromagnetic device having a winding and an armature variably moved with changes in the energization of the winding, means including a spring providing a motion reducing connection between said armature and said element, and mechanism for maintaining said winding energized and varying the energization thereof progressively with changes in the position of said member.

14. A control for conditioning apparatus having, in combination, a member for regulating the capacity of said apparatus, a sensitive control instrument having a control element movable in opposite directions in response to opposite changes in the controlled condition, a power operator controlled by said instrument for modulating the position of said member, a power actuator adjacent said element, means including a coiled contractile spring providing a motion reducing connection between said actuator and said element, and mechanism actuated by said operator for transmitting power to said actuator and varying such power progressively in accordance with changes in the position of said member.

15. A control for conditioning apparatus having, in combination, a reversible power operator having a driven member, control means governing said operator to modulate the position of said member including a device selectively movable in opposite directions to determine the direction of such modulation, a solenoid comprising a coil and an armature disposed unsymmetrically within said coil, a condition responsive instrument including a resilient element movable in opposite directions with opposite condition changes, means fixedly supporting one end of said element leaving the opposite end portion freely movable, means mechanically connecting said free end portion with said control device and said armature and constituting said element the sole means for supporting and guiding the movements of the armature, and mechanism normally maintaining said solenoid energized and varying the energization thereof progressively with changes in the position of said driven member and thereby proportioning the movements of the member accurately in accordance with condition changes.

GEORGE FORREST DRAKE.